United States Patent
Roh et al.

(10) Patent No.: US 10,084,219 B2
(45) Date of Patent: Sep. 25, 2018

(54) BATTERY PACK HAVING IMPROVED SAFETY AGAINST LEAKAGE OF LIQUID REFRIGERANT

(71) Applicant: LG CHEM, LTD., Seoul (KR)

(72) Inventors: Tae Hwan Roh, Daejeon (KR); Jin Kyu Lee, Daejeon (KR); Tae Hyuck Kim, Daejeon (KR); Junhee Jung, Daejeon (KR); Yoonhee Lee, Daejeon (KR); Jong Moon Yoon, Daejeon (KR); Jong Soo Ha, Daejeon (KR)

(73) Assignee: LG CHEM, LTD., Seoul (KR)

( * ) Notice: Subject to any disclaimer, the term of this patent is extended or adjusted under 35 U.S.C. 154(b) by 275 days.

(21) Appl. No.: 14/762,218

(22) PCT Filed: Jun. 3, 2014

(86) PCT No.: PCT/KR2014/004909
§ 371 (c)(1),
(2) Date: Jul. 21, 2015

(87) PCT Pub. No.: WO2014/196778
PCT Pub. Date: Dec. 11, 2014

(65) Prior Publication Data
US 2016/0087319 A1  Mar. 24, 2016

(30) Foreign Application Priority Data

Jun. 7, 2013  (KR) .................. 10-2013-0065103

(51) Int. Cl.
*H01M 10/6567* (2014.01)
*H01M 2/10* (2006.01)
(Continued)

(52) U.S. Cl.
CPC ..... *H01M 10/6567* (2015.04); *H01M 2/0237* (2013.01); *H01M 2/1077* (2013.01);
(Continued)

(58) Field of Classification Search
CPC ......... H01M 10/6567; H01M 10/6568; H01M 10/6556; H01M 10/6551; H01M 10/6555;
(Continued)

(56) References Cited

U.S. PATENT DOCUMENTS

2007/0018610 A1\* 1/2007 Wegner ............... H01M 2/0212
                                                                  320/112
2009/0142628 A1    6/2009 Okada et al.
(Continued)

FOREIGN PATENT DOCUMENTS

CN    1996641 A     7/2007
CN    101841072 A   9/2010
(Continued)

OTHER PUBLICATIONS

Machine English translation of KR 10-2013-0013947 to Lee et al. (Year: 2013).\*
(Continued)

*Primary Examiner* — Michael L Dignan
(74) *Attorney, Agent, or Firm* — Birch, Stewart, Kolasch & Birch, LLP

(57) ABSTRACT

Disclosed herein is a battery pack including at least one battery module including a battery cell stack constituted by two or more stacked battery cells that can be charged and discharged and a pack case for surrounding an outside of the battery module, wherein a liquid refrigerant isolated from an inner space of the pack case removes heat conducted from the battery cells through cooling of the pack case.

17 Claims, 5 Drawing Sheets

(51) Int. Cl.
*H01M 10/625* (2014.01)
*H01M 10/647* (2014.01)
*H01M 10/6556* (2014.01)
*H01M 10/6551* (2014.01)
*H01M 10/6555* (2014.01)
*H01M 10/613* (2014.01)
*H01M 10/615* (2014.01)
*H01M 2/02* (2006.01)
*H01M 10/637* (2014.01)
*H01M 10/48* (2006.01)

(52) U.S. Cl.
CPC ....... *H01M 2/1094* (2013.01); *H01M 10/613* (2015.04); *H01M 10/615* (2015.04); *H01M 10/625* (2015.04); *H01M 10/647* (2015.04); *H01M 10/6551* (2015.04); *H01M 10/6555* (2015.04); *H01M 10/6556* (2015.04); *H01M 10/486* (2013.01); *H01M 10/637* (2015.04); *H01M 2220/20* (2013.01)

(58) Field of Classification Search
CPC ............. H01M 10/615; H01M 2/0237; H01M 10/637; H01M 2/1094; H01M 10/613; H01M 2/1077; H01M 10/625; H01M 10/647; H01M 2220/20
See application file for complete search history.

(56) References Cited

U.S. PATENT DOCUMENTS

| 2009/0208829 | A1* | 8/2009 | Howard | F28D 15/0233 |
| | | | | 429/120 |
| 2010/0136402 | A1* | 6/2010 | Hermann | H01M 2/1077 |
| | | | | 429/120 |
| 2010/0147488 | A1 | 6/2010 | Pierre et al. | |
| 2012/0164507 | A1 | 6/2012 | Lachenmeier et al. | |
| 2012/0244398 | A1* | 9/2012 | Youngs | B60K 6/28 |
| | | | | 429/61 |
| 2012/0263988 | A1* | 10/2012 | Obasih | H01M 10/625 |
| | | | | 429/98 |
| 2012/0270075 | A1* | 10/2012 | Fujimura | H01M 2/02 |
| | | | | 429/7 |
| 2013/0004822 | A1 | 1/2013 | Hashimoto et al. | |
| 2014/0284043 | A1* | 9/2014 | Arai | F01P 3/20 |
| | | | | 165/287 |

FOREIGN PATENT DOCUMENTS

| CN | 201946715 U | 8/2011 | | |
| CN | 202205826 U | 4/2012 | | |
| DE | 10 2008 034 862 A1 | 1/2010 | | |
| DE | 10 2010 041 277 A1 | 3/2012 | | |
| EP | 2 405 528 A1 | 1/2012 | | |
| EP | 2 541 668 A1 | 1/2013 | | |
| JP | 6-20716 A | 1/1994 | | |
| JP | 2007-12394 A | 1/2007 | | |
| JP | 2009-134938 A | 6/2009 | | |
| JP | 2009-301877 A | 12/2009 | | |
| JP | 2010-15788 A | 1/2010 | | |
| JP | 2010-40420 A | 2/2010 | | |
| JP | 2012-18915 A | 1/2012 | | |
| JP | 2012-248299 A | 12/2012 | | |
| KR | 10-2013-0004141 A | 1/2013 | | |
| KR | 10-2013-0005756 A | 1/2013 | | |
| KR | 10-2013-0013947 | * | 2/2013 | ............. H01M 2/40 |
| KR | 10-2013-0013947 A | 2/2013 | | |
| WO | WO 2011/084937 A2 | 7/2011 | | |
| WO | WO 2012/133708 A1 | 10/2012 | | |

OTHER PUBLICATIONS

International Search Report issued in PCT/KR2014/004909, dated Sep. 26, 2014.

* cited by examiner

[FIG. 1]
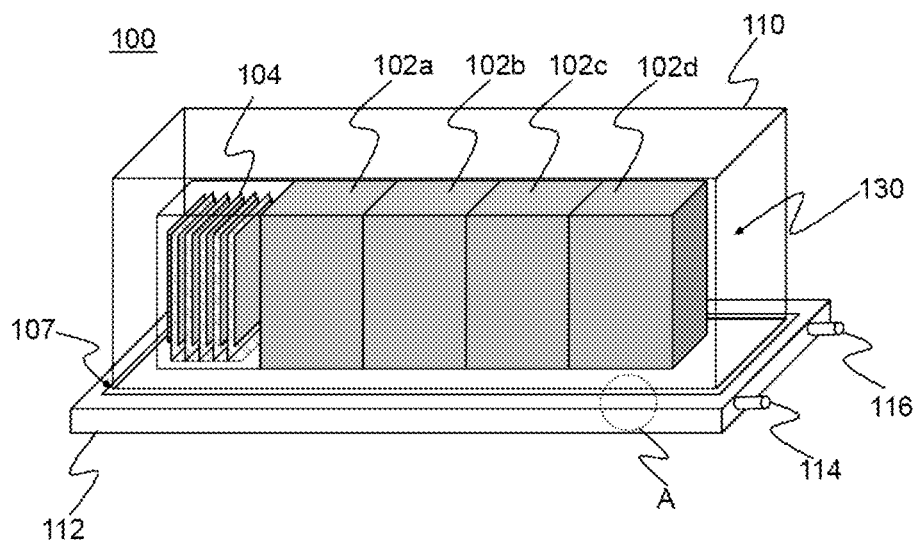
[FIG. 2]
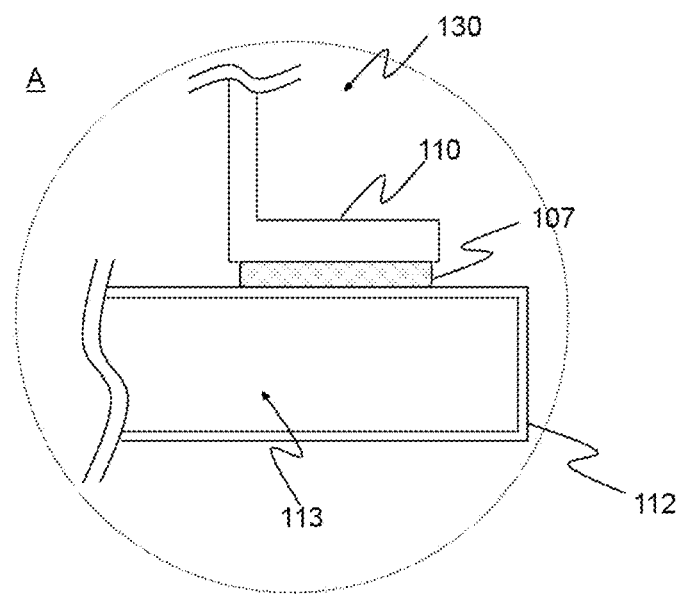

[FIG. 3]
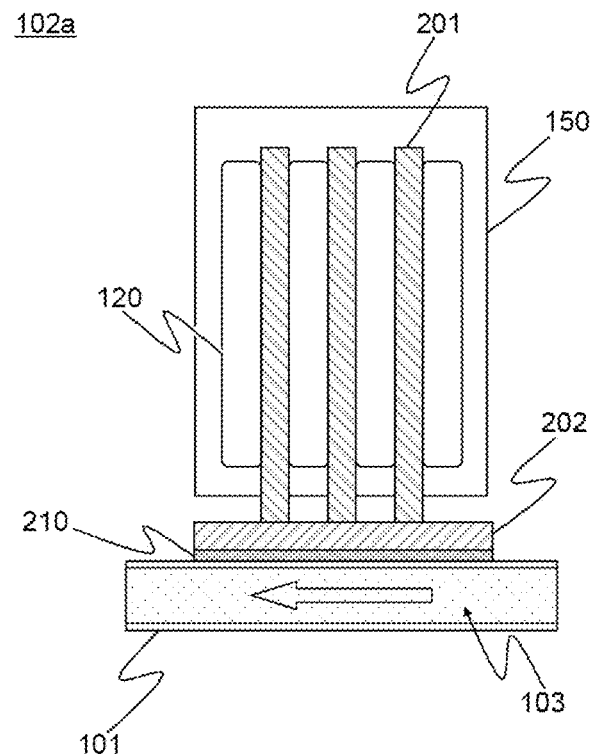
[FIG. 4]
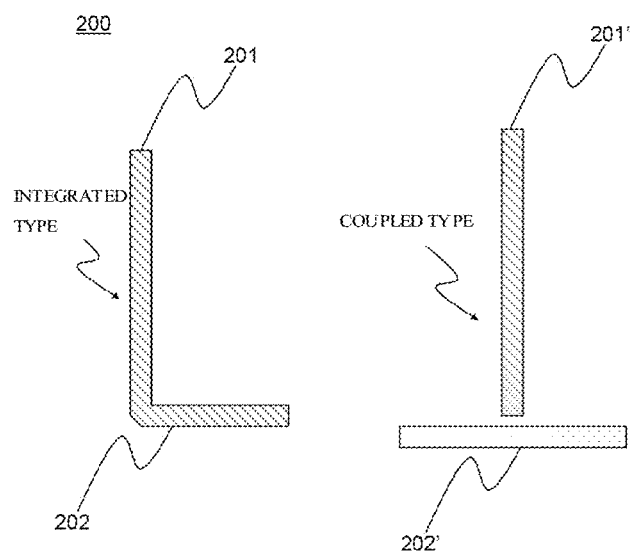

【FIG. 5】
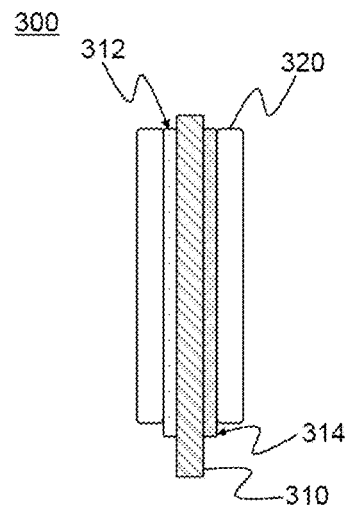
【FIG. 6】
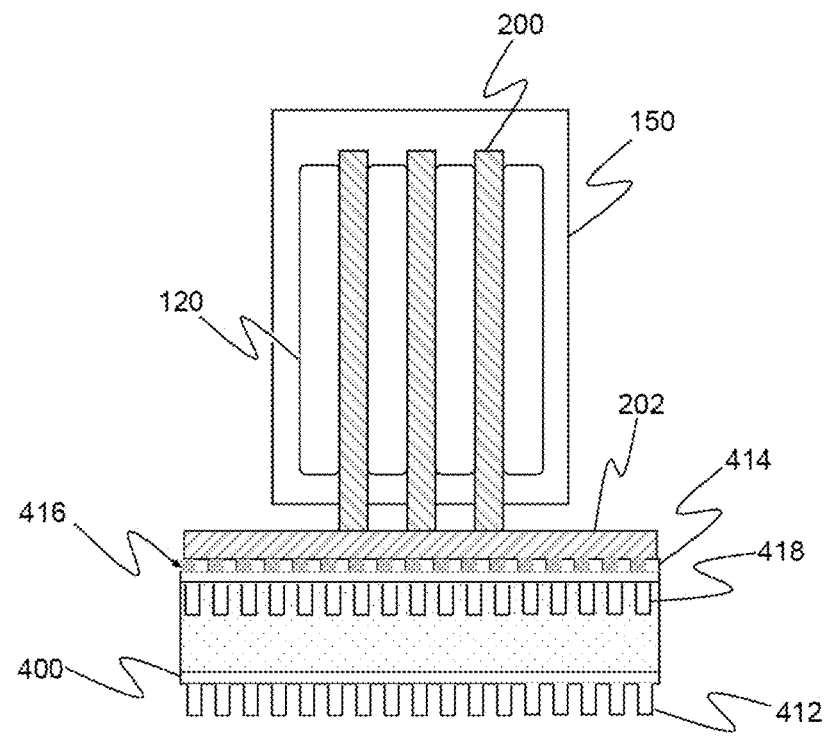

[FIG. 7]
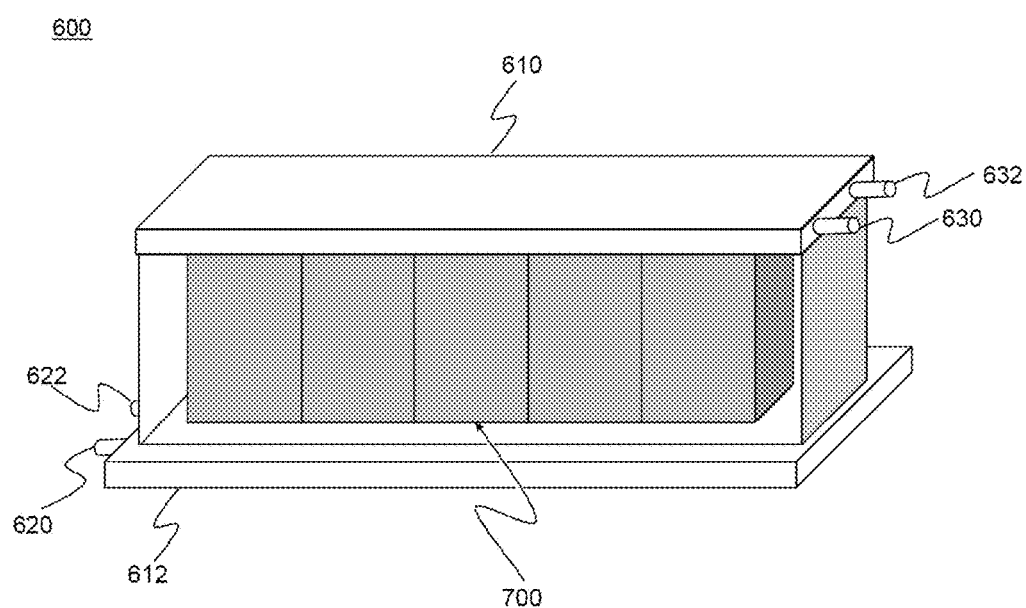

[FIG. 8]
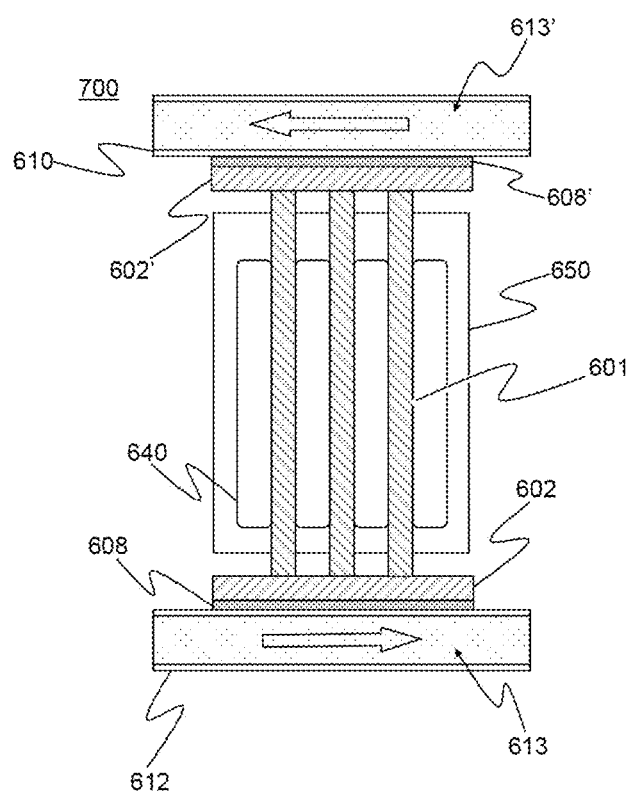

BATTERY PACK HAVING IMPROVED SAFETY AGAINST LEAKAGE OF LIQUID REFRIGERANT

TECHNICAL FIELD

The present invention relates to a battery pack having improved safety against leakage of a liquid refrigerant, and more particularly to a battery pack including at least one battery module including a battery cell stack constituted by two or more stacked battery cells that can be charged and discharged and a pack case for surrounding an outside of the battery module, wherein a liquid refrigerant isolated from an inner space of the pack case removes heat conducted from the battery cells through cooling of the pack case.

BACKGROUND ART

One of the biggest problems caused by vehicles using fossil fuel, such as gasoline and diesel oil, is the creation of air pollution. A technology of using a secondary battery, which can be charged and discharged, as a power source for vehicles has attracted considerable attention as one method of solving the abovementioned problem. As a result, electric vehicles (EV), which are operated using only a battery, and hybrid electric vehicles (HEV), which jointly use a battery and a conventional engine, have been developed. Some electric vehicles and hybrid electric vehicles are now being commercially used.

A hybrid electric vehicle (HEV) is configured to have a structure in which a middle or large-sized battery pack based on secondary batteries which can be charged and discharged and an engine based on gasoline and diesel oil are jointly used, and the battery pack or the engine is controlled to be operated according to traveling conditions of the vehicle, etc. That is, in order to minimize the use of fuel while improving operational efficiency, the engine or the battery pack is selectively operated according to running conditions of the vehicle. For example, when the vehicle runs at a normal speed or moves downward along an incline, only the battery pack is used without using the engine. On the other hand, when the vehicle runs at an accelerated speed or moves upward along an incline, the engine based on fuel is mainly operated. At this time, kinetic energy generated during operation of the engine is converted into electric energy, with which the battery pack is charged.

A nickel-metal hydride (Ni-MH) secondary battery or a lithium secondary battery has been mainly used as the power source for electric vehicles (EV) and hybrid electric vehicles (HEV). High output and large capacity are needed for such a secondary battery to be used as the power source for the electric vehicles (EV) and the hybrid electric vehicles (HEV). To this end, a plurality of small-sized secondary batteries (unit cells) is connected in series or in parallel to each other to constitute a battery module, and a plurality of battery modules is connected in parallel or in series to each other to constitute a battery pack.

However, a larger amount of heat is generated from such a high-output, large-capacity secondary battery during charge and discharge of the secondary battery. If heat generated from the unit cells during charge and discharge of the unit cells is not effectively removed from the unit cells, the heat accumulates in the unit cells with the result that deterioration of the unit cells is caused.

For this reason, a battery pack for vehicles, which is a high-output, large-capacity battery including a plurality of middle or large-sized battery modules, needs a cooling system to cool battery cells or battery modules mounted therein.

In connection with this case, a cooling technology using a liquid refrigerant to cool the battery cells or the battery module within a short time has attracted considerable attention, and the demand of a battery pack for vehicles adopting such a cooling technology has increased.

In the battery pack adopting the cooling technology using the liquid refrigerant, however, refrigerant channels are provided between battery cells or battery modules stacked in a pack case, or the refrigerant channels contact an additional thermal conduction member disposed in the pack case. For this reason, it is necessary to provide various joints and connection members for connection between the refrigerant channels. In addition, for the battery pack for vehicles, which is continuously affected by vibration for a long time, connections between the refrigerant channels and the joints may be broken when the liquid refrigerant flows along the refrigerant channels provided in an inner space of the battery pack with the result that leakage of the refrigerant may occur.

In a case in which the leaked liquid refrigerant contact bus bars, wires, and connectors disposed in the inner space of the battery pack, an insulation breakdown or a short circuit may be caused with the result that the vehicle may catch a fire.

Furthermore, connection members for fixing the refrigerant channels are disposed in the inner space of the pack case with the result that a manufacturing process of the battery pack is complicated, and component maintenance cost is increased.

Therefore, there is a high necessity for a battery pack having excellent safety against leakage of a refrigerant.

DISCLOSURE

Technical Problem

Therefore, the present invention has been made to solve the above problems, and other technical problems that have yet to be resolved.

Specifically, it is an object of the present invention to provide a battery pack configured to have a structure in which a liquid refrigerant isolated from an inner space of a pack case removes heat conducted from battery cells through cooling of the pack case, whereby it is possible to fundamentally prevent the liquid refrigerant from being introduced into the inner space of the pack case.

Technical Solution

In accordance with one aspect of the present invention, the above and other objects can be accomplished by the provision of a battery pack including at least one battery module including a battery cell stack constituted by two or more stacked battery cells that can be charged and discharged and a pack case for surrounding an outside of the battery module, wherein a liquid refrigerant isolated from an inner space of the pack case removes heat conducted from the battery cells through cooling of the pack case.

The liquid refrigerant for cooling the battery pack is isolated from the inner space of the pack case. As previously described, the refrigerant channel, along which the liquid refrigerant flows, is not provided in the inner space of the pack case, in which the battery cells and the battery module are arranged. Even when a refrigerant channel is broken due to vibration or impact applied to the battery pack, therefore, there is no possibility that the liquid refrigerant will be introduced into the inner space of the pack case. In addition, joints and fixing members for fixing the refrigerant channel are not needed. Consequently, it is possible to configure the battery pack such that the battery pack has a compact structure while considerably reducing a possibility that the refrigerant channel will be broken.

In a concrete example, the refrigerant channel, along which the liquid refrigerant flows, may be provided at an outer surface of the pack case or in a hollow space of the pack case. Specifically, the refrigerant channel may have an inlet port and an outlet port, and the refrigerant channel, the inlet port, and the outlet port may be isolated from the inner space of the pack case, in which the battery cells and the battery module are arranged. Consequently, it is possible to prevent the liquid refrigerant from being introduced into the inner space of the pack case.

In addition, the pack case may be made of a thermally conductive material. The pack case of the present invention may hermetically seal, protect, and support the battery module and electric components mounted in the battery module and, in addition, function as a heat dissipation plate for performing heat exchange between the battery cells and the refrigerant. Consequently, the pack case may be used as a heat exchange medium for effectively removing heat from the liquid refrigerant isolated from the pack case. The thermally conductive material may be a material exhibiting high thermal conductivity and mechanical rigidity. Specifically, thermally conductive material may be a metal material, a thermally conductive polymer, or a thermally conductive polymer composite. However, the present invention is not limited thereto.

The battery module may be configured to have a structure in which the battery cell stack is mounted in a module case so as to prevent impact from being applied to the battery cell stack or to prevent corrosion of the battery cell stack. The module case may be provided at one surface thereof with connectors for electrical connection between the battery modules and fastening grooves or beads for mechanical fastening between the battery modules. However, the present invention is not limited thereto. The module case may be configured to have various structures.

In a concrete example, for more effective conduction of heat from the battery cell stack, a cooling fin made of a thermally conductive material may be interposed between the battery cells of the battery cell stack, and the cooling fin may extend to the module case for heat conduction to the pack case.

Specifically, the cooling fin may include a first fin member interposed between the battery cells and a second fin member thermally contacting the pack case. In this case, the first fin member directly contacting the battery cells conducts heat from the battery cells to the second fin member extending to the module case, and the second fin member thermally contacting one surface of the pack case conducts the heat received from the first fin member to the pack case.

In an example, the first fin member interposed between the battery cells and the second fin member extending from the first fin member may be integrated to have an integrated type structure. That is, in a state in which the first fin member extends to the pack case, an end of the first fin member may be perpendicularly bent such that the second fin member thermally contacts one surface of the pack case.

In another example, the first fin member interposed between the battery cells and the second fin member extending from the first fin member may be separate members, which may be coupled to each other by welding. In this case, the first fin member and the second fin member may be made of the same material. Alternatively, the first fin member and the second fin member may be made of different materials.

For both the integrated type cooling fin and the coupled type cooling fin, the second fin member may directly contact the pack case in consideration of thermal conductivity of the second fin member. In addition, a material or member for improving thermal conductivity may be further provided between the second fin member and the pack case.

In general, complete tight contact between solids may not be substantially achieved. As a result, an empty space or a gap is provided between the solids, whereby a thermal conduction rate may be reduced.

In a concrete example, therefore, a thermally conductive material, such as thermal compound or thermal grease, may be coated at an interface between the first fin member and each of the battery cells and/or an interface between the second fin member and the pack case.

As a result, the thermally conductive material is effectively filled in the empty space or the gap between the first fin member and each of the battery cells and the empty space or the gap between the second fin member and the pack case, thereby preventing the reduction of the thermal conduction rate. In addition, thermal compound or thermal grease, which is a material exhibiting high thermal conductivity, may accelerate heat exchange.

In another concrete example, a thermally conductive pad made of a urethane material or a silicone material may be disposed at the interface between the first fin member and each of the battery cells and/or the interface between the second fin member and the pack case. Consequently, it is possible to increase a thermal conduction rate of the cooling fin and thus to improve thermal conductivity of the cooling fin.

According to circumstances, the pack case may be further provided at an inner surface or an outer surface thereof which the second fin member of the cooling fin thermally contacts with a heat dissipation plate having a radiator structure for accelerating heat dissipation.

In a concrete example, the pack case may include a first case member for surrounding a portion of the outer surface of the battery module and a second case member coupled to the first case member for surrounding the rest of the outer surface of the battery module. The refrigerant channel may be provided in the first case member and/or the second case member so as to cool the first case member and/or the second case member.

According to circumstances, refrigerant channels may be provided at all of the outer surfaces of the first case member and the second case member so as to further improve cooling efficiency of the battery pack.

Since the pack case include the first case member and the second case member, it is possible to individually select the sizes, thicknesses, and materials of the first case member and the second case, which is preferable in that applicability and generality of the pack case can be extended in consideration of the shape and size of the battery.

In the above structure, a sealing member, such as rubber or silicone, which exhibits high watertightness may be disposed at an interface between the first case member and the second case member so as to completely prevent penetration of moisture into the inner case of the pack case. In this case, it is possible to fundamentally prevent an insulation breakdown or a short circuit which may be caused by the liquid refrigerant or moisture discharged from the outside of the pack case, thereby further improving safety of the battery pack. In addition, the sealing member secures coupling between the first case member and the second case member, thereby improving stability of the battery pack exposed to vibration or external force.

In a concrete example, the battery pack may further include thermistors for measuring temperature of the battery cell stack, temperature of the pack case, and external temperature of the battery pack, and a controller for controlling the liquid refrigerant to cool or heat the pack case based on the measured temperature values received from the thermistors.

Each of the battery cells is not particularly restricted so long as each of the battery cells is a secondary battery that is capable of providing high voltage and high current when a battery module or a battery pack is manufactured using the battery cells. For example, each of the battery cells may be a lithium secondary battery having a large amount of energy storage per volume.

In accordance with another aspect of the present invention, there is provided a device including the battery pack with the above-stated construction.

The device may be an electric vehicle having a high-output, large-capacity battery pack mounted therein, a hybrid electric vehicle, a plug-in hybrid electric vehicle, or a power storage device. However, the present invention is not limited thereto.

The structure and manufacturing process of the device are well known in the art to which the present invention pertains and, therefore, a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is a typical view showing a battery pack according to an embodiment of the present invention;

FIG. 2 is an enlarged typical view showing a region A of FIG. 1;

FIG. 3 is a vertical sectional view of a battery module having a battery cell stack mounted therein shown in FIG. 1;

FIG. 4 is a typical view showing a cooling fin according to an embodiment of the present invention;

FIG. 5 is a typical view showing a cooling fin according to another embodiment of the present invention;

FIG. 6 is a typical view showing a battery module according to another embodiment of the present invention;

FIG. 7 is a typical view showing a battery pack according to another embodiment of the present invention; and FIG. 8 is a vertical sectional view of a battery module having a battery cell stack mounted therein shown in FIG. 7.

BEST MODE

Now, exemplary embodiments of the present invention will be described in detail with reference to the accompanying drawings. It should be noted, however, that the scope of the present invention is not limited by the illustrated embodiments.

FIG. 1 is a view typically showing the structure of a battery pack according to an embodiment of the present invention, and FIG. 2 is an enlarged typical view showing a region A of FIG. 1. For the convenience of description, FIG. 1 is shown as a see-through view.

Referring to these figures, a battery pack 100 is configured to have a structure in which battery modules 102*a*, 102*b*, 102*c*, and 102*d*, each of which has a battery cell stack 104 mounted therein, are disposed in an inner space 130 of a pack case including a first case member 110 for surrounding the other surfaces of each of the battery modules 102*a*, 102*b*, 102*c*, and 102*d* excluding the lower end or one surface of each of the battery modules 102*a*, 102*b*, 102*c*, and 102*d* and a second case member 112 coupled to the lower end or one surface of the first case member 110 for supporting the lower end of the battery modules 102 such that the battery modules 102*a*, 102*b*, 102*c*, and 102*d* are arranged in a line.

A sealing member 107 having a watertight function is disposed at an interface between the first case member 110 and the second case member 112. Consequently, the battery pack 100 is hermetically isolated from the outside, whereby safety of the battery pack 100 against a leaked refrigerant or moisture is improved.

A refrigerant channel (not shown) is defined in a hollow space of the second case member 112 in a state in which the second case member 112 is isolated from the inner space 130 of the battery pack 100. The second case member 112 is provided at one end thereof with an inlet port 114 and an outlet port 116 of the refrigerant channel, through which a liquid refrigerant is introduced and discharged. Consequently, a refrigerant introduced through the inlet port 114 flows along the refrigerant channel defined in the hollow space 113 of the second case member 112. At this time, the refrigerant exchanges heat with the second case member 112, and is then discharged through the outlet port 116.

In the battery pack 100 having the above-described structure, the refrigerant channel is defined in the second case member 112 in a state in which the refrigerant channel is isolated from the inner space 130. Even when leakages of the refrigerant occurs, therefore, it is possible to fundamentally prevent the leaked refrigerant from permeating into the battery cell stacks 104 and the battery modules 102*a*, 102*b*, 102*c*, and 102*d* arranged in the inner space 130 of the battery pack 100.

FIG. 3 is a vertical sectional view of a battery module having a battery cell stack mounted therein shown in FIG. 1, and FIG. 4 is a view typically showing a cooling fin according to an embodiment of the present invention.

Referring to these figures, a cooling fin 200 may be configured to have an integrated type structure in which an end of a first fin member 201 extends to form a second fin member 202 perpendicularly bent from the first fin member 201. Alternatively, the cooling fin 200 may be configured to have a coupled type structure in which a second fin member 202' is coupled to an end of a first fin member 201' by welding such that the second fin member 202' is thermally coupled to a pack case 101.

The battery module 102*a* is configured to have a structure in which battery cells 120 are mounted in a module case 150 having passages of the first fin members 201 formed at one end or the lower end thereof in a state in which the battery cells 120 are arranged while being stacked in a state in which the first fin members 201 are interposed between the respective battery cells 120. The first fin members 201 extend through the module case 150 in a direction perpendicular to a direction in which the battery cells 120 are stacked such that the first fin members 201 contact the second fin member 202 in a state in which the first fin members 201 tightly contact the respective battery cells 120 while being interposed between the respective battery cells 120. One surface of the second fin member 202 contacts the first fin members 201 in a state in which the second fin member 202 extends in a direction perpendicular to a direction in which the first fin members 201 extend. A thermally conductive pad 210 for accelerating heat transfer is disposed at an interface between the second fin member 202 and the pack case 101.

The battery module is cooled as follows. Initial heat generated from the battery cells 120 is transferred to the second fin member 202 via the first fin members 201, and the pack case 101 receives the heat from the second fin member 202 via the thermally conductive pad 210. At this time, heat exchange is performed between the pack case 101 and a refrigerant in a hollow space 103 of the pack case 101. As a result, the battery module 102a is cooled.

FIG. 5 is a typical view showing a cooling fin according to another embodiment of the present invention.

Referring to FIG. 5, a first fin member 310 of a cooling fin 300 may be interposed between battery cells 320, and a thermally conductive material 312, such as thermal compound or thermal grease, and a thermally conductive pad 314 made of a urethane material or a silicone material may be disposed at interfaces between the first fin member 310 and the respective battery cells 320 such that initial heat generated from the battery cells is rapidly conducted to the thermally conductive material 312 and the thermally conductive pad 314. Alternatively, only the thermally conductive pad 314 or the respective battery cells 320 may be disposed at interfaces between the first fin member 310 and the respective battery cells 320.

FIG. 6 is a view typically showing a battery module according to another embodiment of the present invention.

Referring to FIG. 6, a first heat dissipation plate 414 having a radiator structure is formed at a contact surface of a pack case 400 on which a second fin member 202 thermally contacts the pack case 400. In order to minimize an empty space defined between the first heat dissipation plate 414 and the second fin member 202, a thermally conductive material 416, such as thermal compound or thermal grease, which has viscosity and is solidified after the lapse of a predetermined time, is applied to the first heat dissipation plate 414. Consequently, the empty space defined between the first heat dissipation plate 414 and the second fin member 202 is effectively filled with the thermally conductive material 416, thereby increasing a thermal conduction rate and thus improving thermal conductivity.

According to circumstances, it is possible to use a hybrid type cooling structure in which a cooling fan (not shown) may be disposed around the first heat dissipation plate 414 without application of the thermally conductive material such that heat transferred from the first heat dissipation plate 414 by convection is cooled in an air cooling fashion, and heat conducted to an interface between the first heat dissipation plate 414 and the second fin member 202 is cooled in a water cooling fashion.

On the other hand, a second heat dissipation plate 412 having a radiator structure for accelerating heat dissipation may be disposed at a portion of the outer surface of the pack case 400 opposite to the contact surface of the pack case 400 which the second fin member 202 contacts, and a cooling fan may be provided around the second heat dissipation plate 412. That is, a hybrid type cooling structure may be provided. In addition, a third heat dissipation plate 418 having a radiator structure for accelerating heat exchange with a refrigerant may be disposed in the pack case 400.

FIG. 7 is a view typically showing a battery pack according to another embodiment of the present invention.

Referring to FIG. 7, a battery pack 600 is configured to have a structure in which a first case member 610 and a second case member 612 constituting a pack case surround outer surfaces of battery modules. A refrigerant channel, along which a refrigerant for cooling battery cells and battery modules 700 flows, is defined in a hollow space of one side of the first case member 610 in a state in which the first case member 610 is isolated from an inner space of the battery pack 600 in which the battery cells and the battery modules 700 are arranged. The second case member 612 is coupled to one surface of the first case member 610 in a state in which the second case member 612 surrounds one surface of each of the battery modules. The first case member 610 is provided at one end thereof with an inlet port 630 and an outlet port 632 of the refrigerant channel (not shown), through which a liquid refrigerant is introduced and discharged. The second case member 612 is provided at one end thereof opposite to the end of the first case member 610 at which the inlet port 630 and the outlet port 632 of the refrigerant channel (not shown), through which the liquid refrigerant is introduced and discharged, are formed with an inlet port 622 and an outlet port 620 of the refrigerant channel (not shown), through which a liquid refrigerant is introduced and discharged.

In the battery pack 600 of FIG. 7, the first case member 610 and the second case member 612 may each have a hollow space of a predetermined volume. Flow directions of the refrigerants in the hollow spaces of the first case member 610 and the second case member 612 may be opposite to each other such that heat exchange between the refrigerants and the battery cells or the battery modules can be uniformly achieved. In addition, the refrigerant may flow in the hollow spaces provided in all of the sides of the first case member 610 to improve cooling efficiency in consideration of the amount of heat generated from the battery pack based on the size and the capacity of the battery pack.

FIG. 8 is a vertical sectional view of a battery module having a battery cell stack mounted therein shown in FIG. 7.

Referring to FIG. 8, a battery module 700 is hermetically isolated from the outside by a module case 650 having passages of the first fin members 601 formed at the upper end and the lower end thereof in a state in which the battery cells 640 are arranged while being stacked in a state in which the first fin members 601 are interposed between the respective battery cells 640. The first fin members 601 extend through the module case 650 in a direction perpendicular to a direction in which the battery cells 640 are stacked such that the first fin members 601 contact second fin members 602 and 602' in a state in which the first fin members 601 tightly contact the respective battery cells 640 while being interposed between the respective battery cells 640. One surface of each of the second fin members 602 and 602' contacts the first fin members 601 and is coupled to the first fin members 601 by welding in a state in which the second fin members 602 and 602' extend in a direction perpendicular to a direction in which the first fin members 601 extend. Thermally conductive pads 608 and 608' for accelerating heat transfer are disposed at an interface between the second fin member 602 and the second case member 612 and an interface between the second fin member 602' and the first case member 610, respectively.

The battery module is cooled as follows. Initial heat generated from the battery cells 640 is transferred to the second fin members 602 and 602' via the first fin members 601, and the first case member 610 and the second case member 612 receives the heat from the second fin members 602 and 602' via the thermally conductive pads 608 and 608'. At this time, heat exchange is performed between the first case member 610 and the second case member 612 and refrigerants in hollow spaces 613 and 613' of the first case member 610 and the second case member 612. As a result, the battery module 700 is cooled.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, in a battery pack according to the present invention, it is not necessary to provide a refrigerant channel, along which a liquid refrigerant flows, in an inner space of a pack case. Consequently, it is possible to fundamentally prevent the liquid refrigerant from being introduced into the inner space of the pack case. In addition, battery cells and battery modules are arranged in the inner space of the pack case, which is completely hermetically isolated from the outside. Consequently, it is possible to prevent the liquid refrigerant from permeating into the battery cells and the battery modules. Furthermore, the pack case performs a heat exchange function while protecting and supporting the battery modules and electric components mounted in the battery modules. Consequently, it is possible to manufacture the battery pack such that the battery pack has a compact structure.

The invention claimed is:

1. A battery pack comprising:
    at least one battery module comprising a battery cell stack constituted by two or more stacked battery cells that can be charged and discharged; and
    a pack case provided outside of the at least one battery module, wherein
    a liquid refrigerant isolated from an inner space of the pack case removes heat conducted from the battery cells through cooling of the pack case,
    wherein the at least one battery module is mounted in a module case, the entire module case being spaced from the pack case,
    wherein the cooling fin comprises a plurality of first fin members, each first fin member being interposed between adjacent battery cells, and a second fin member connected to the plurality of first fin members and extending perpendicular to each first fin member, and the second fin member thermally contacting the pack case, wherein the second fin member is separate from the pack case, and
    wherein the pack case is provided with a first heat dissipation plate having a radiator structure formed at a contact surface of the pack case on which the second fin member thermally contacts the pack case, a second heat dissipation plate having a radiator structure for accelerating heat dissipation disposed at a portion of the outer surface of the pack case opposite to the contact surface of the pack case which the second fin member contacts, and a third heat dissipation plate having a radiator structure for accelerating heat exchange with a refrigerant disposed in the pack case.

2. The battery pack according to claim 1, wherein the second fin member directly contacts the pack case.

3. The battery pack according to claim 1, wherein a thermally conductive material is coated at an interface between the first fin member and each of the battery cells and/or an interface between the second fin member and the pack case.

4. The battery pack according to claim 3, wherein thermally conductive material is thermal compound or thermal grease.

5. The battery pack according to claim 1, wherein a thermally conductive pad is disposed at an interface between the first fin member and each of the battery cells and/or an interface between the second fin member and the pack case.

6. The battery pack according to claim 5, wherein the thermally conductive pad is made of a urethane material or a silicone material.

7. The battery pack according to claim 1, wherein the pack case comprises a first case member for surrounding a portion of an outer surface of the at least one battery module and a second case member coupled to the first case member for surrounding the rest of the outer surface of the at least one battery module.

8. The battery pack according to claim 7, wherein a sealing member is disposed at an interface between the first case member and the second case member.

9. The battery pack according to claim 8, wherein the sealing member is made of rubber or silicone.

10. The battery pack according to claim 1, wherein the pack case is made of a thermally conductive material.

11. The battery pack according to claim 10, wherein the thermally conductive material is a metal material, a thermally conductive polymer, or a thermally conductive polymer composite.

12. The battery pack according to claim 1, wherein a refrigerant channel, along which the liquid refrigerant flows, is provided at an outer surface of the pack case or in a hollow space of the pack case.

13. The battery pack according to claim 12, wherein the refrigerant channel has an inlet port and an outlet port, and the refrigerant channel, the inlet port, and the outlet port are isolated from the inner space of the pack case.

14. The battery pack according to claim 1, further comprising:
    thermistors for measuring temperature of the battery cell stack, temperature of the pack case, and external temperature of the battery pack; and
    a controller for controlling the liquid refrigerant to cool or heat the pack case based on the measured temperature values received from the thermistors.

15. The battery pack according to claim 1, wherein each of the battery cells is a lithium secondary battery.

16. A device having a battery pack according to claim 1 mounted therein.

17. The device according to claim 16, wherein the device is selected from a group consisting of an electric vehicle, a hybrid electric vehicle, a plug-in hybrid electric vehicle, and a power storage device.

* * * * *